United States Patent
Booth et al.

(10) Patent No.: US 8,392,635 B2
(45) Date of Patent: Mar. 5, 2013

(54) SELECTIVELY ENABLING A HOST TRANSFER INTERRUPT

(75) Inventors: Jing Booth, San Jose, CA (US); Rebekah A. Wilson, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/976,608

(22) Filed: Dec. 22, 2010

(65) Prior Publication Data

US 2012/0166685 A1 Jun. 28, 2012

(51) Int. Cl.
G06F 3/00 (2006.01)
G06F 13/24 (2006.01)
(52) U.S. Cl. .......................................... 710/48; 710/262
(58) Field of Classification Search ....................... 710/48
See application file for complete search history.

(56) References Cited

U.S. PATENT DOCUMENTS

| | | | |
|---|---|---|---|
| 5,005,142 A * | 4/1991 | Lipchak et al. ................ 702/183 |
| 5,376,752 A * | 12/1994 | Limberis et al. ................ 84/622 |
| 5,465,338 A | 11/1995 | Clay |
| 5,781,784 A | 7/1998 | McKinley |
| 6,754,765 B1 | 6/2004 | Chang et al. |
| 7,120,771 B2 * | 10/2006 | Dahan et al. .................. 711/163 |
| 2006/0136644 A1 * | 6/2006 | Martin et al. ................. 710/302 |
| 2009/0168525 A1 | 7/2009 | Olbrich et al. |
| 2009/0172267 A1 | 7/2009 | Oribe et al. |
| 2009/0244983 A1 | 10/2009 | Park |
| 2010/0082919 A1 | 4/2010 | Chen et al. |
| 2010/0125695 A1 | 5/2010 | Wu et al. |
| 2010/0169550 A1 * | 7/2010 | Akita et al. ................... 711/103 |

* cited by examiner

*Primary Examiner* — Henry Tsai
*Assistant Examiner* — John Roche

(57) ABSTRACT

Embodiments of the invention are directed to systems and methods for reducing the number of interrupts on a controller for a non-volatile storage device to improve data transfer performance of the storage system. The embodiments described herein selectively enable an interrupt generated by host transfer hardware for a host command. The interrupt can be enabled or disabled by considering the command type, availability of interface resources to accept additional host transfers, and the command size. Embodiments described herein are useful for host interfaces implementing a tagging scheme for host transfers with a limited range of identification tags.

18 Claims, 4 Drawing Sheets

SELECTIVELY ENABLING A HOST TRANSFER INTERRUPT

BACKGROUND

Non-volatile media storage systems can receive many simultaneous commands from a host. In certain host transfer protocols, commands are sent to a media storage system with a unique command identification tag. When a storage system receives a command from a host, the storage system typically allocates resources and signals the host to execute a host transfer. After the completion of the host transfer, the host transfer hardware of the storage system initiates an interrupt to the storage system controller, which de-allocates resources and determines if a new host transfer can begin. The processing of an interrupt can delay the controller in a storage system controller from executing other processes.

BRIEF DESCRIPTION OF THE DRAWINGS

Systems and methods which embody the various features of the invention will now be described with reference to the following drawings, in which.

DETAILED DESCRIPTION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

System Overview

Embodiments of the invention are directed to systems and methods for reducing the interrupts processed by a controller on a non-volatile storage system to improve data transfer performance of the storage system. The embodiments described herein reduce the circumstances in which an interrupt is generated when data transfer to or from a host (a "host transfer") is completed. In some embodiments, the non-volatile storage system receives commands with an identification tag from a host. In these embodiments, resources can be allocated for host transfers for the predefined range of identification tags and can be safely re-used under certain circumstances without interrupts, which alleviates the need for host interrupts on every host transfer.

Figure 1:
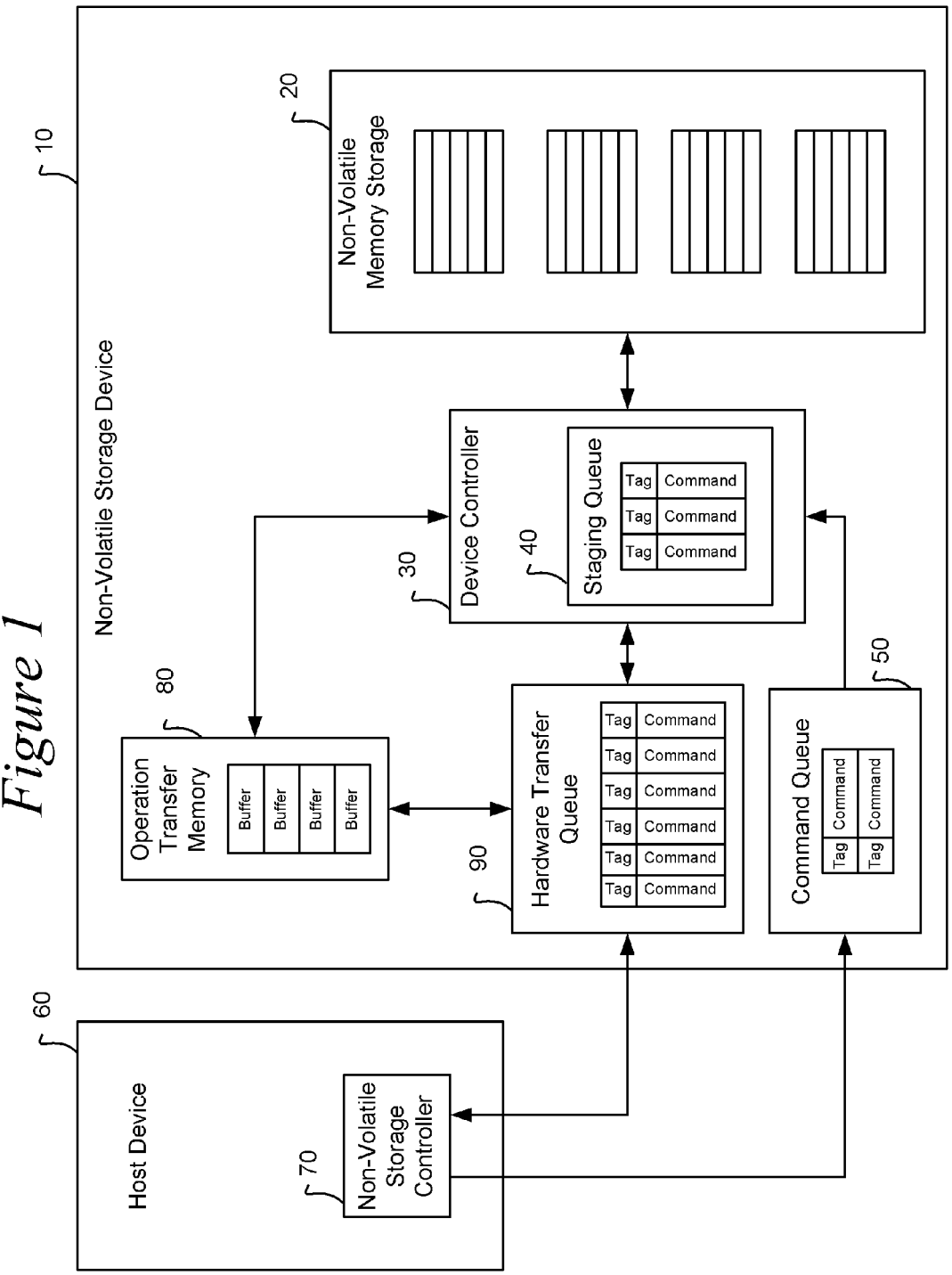
FIG. 1 shows a system overview of an embodiment of the invention.

Referring to FIG. 1, a system diagram is shown of an embodiment of a non-volatile storage device 10 in communication with a host device 60. In this embodiment, the non-volatile storage device 10 comprises non-volatile memory storage 20, a device controller 30, a command queue 50, an operation transfer memory 80, and a hardware transfer queue 90. The host device 60 includes a non-volatile storage controller 70 in communication with the command queue 50 and hardware transfer queue 90. The non-volatile memory storage 20 can comprise a solid-state memory array, a mechanical spinning disk array, a hybrid including solid-state and spinning disk arrays, or any other non-volatile memory storage type. When the host device sends a command to the non-volatile storage device 10, the command is received in the command queue 50. In this embodiment, the interface between the host device 60 and the non-volatile storage device 10 transmits commands which include an identification tag. In certain interface standards, an identification tag can be used to allow multiple outstanding requests to be pending on a storage device. As an example, the SATA interface standard can be configured for native command queuing, which allows up to 32 commands to be outstanding and enables a storage device to determine the order in which to execute commands. Other identification tag standards include tagged command queuing. As shown in FIG. 1, the same identification tag is associated with the memory command within the various queues depicted in FIG. 1 and thus the identification tag can be used as a common reference.

In one embodiment, command queue 50 receives commands from non-volatile storage controller 70. Commands can be stored in the command queue 50 until processed by the device controller 30. Upon receipt of a command from the command queue 50, the device controller may process the command and then prepare for a host transfer. For a read command, the device controller 30 may access the non-volatile memory storage 20 prior to transferring the read data to the host. For a write command, the device controller 30 may request a host transfer to acquire the data from the host to be written to the memory storage.

In one embodiment, the device controller may allocate buffers from an operation transfer memory 80 to host transfer requests. Host transfer requests can then be placed in the host transfer queue 90, which is executed by hardware to complete a host transfer request to send data to or receive data from the host. If the host transfer queue is full, the device controller in this embodiment stores the excess host transfer requests in a staging queue 40.

Host Transfer Complete Interrupts

Figure 2:
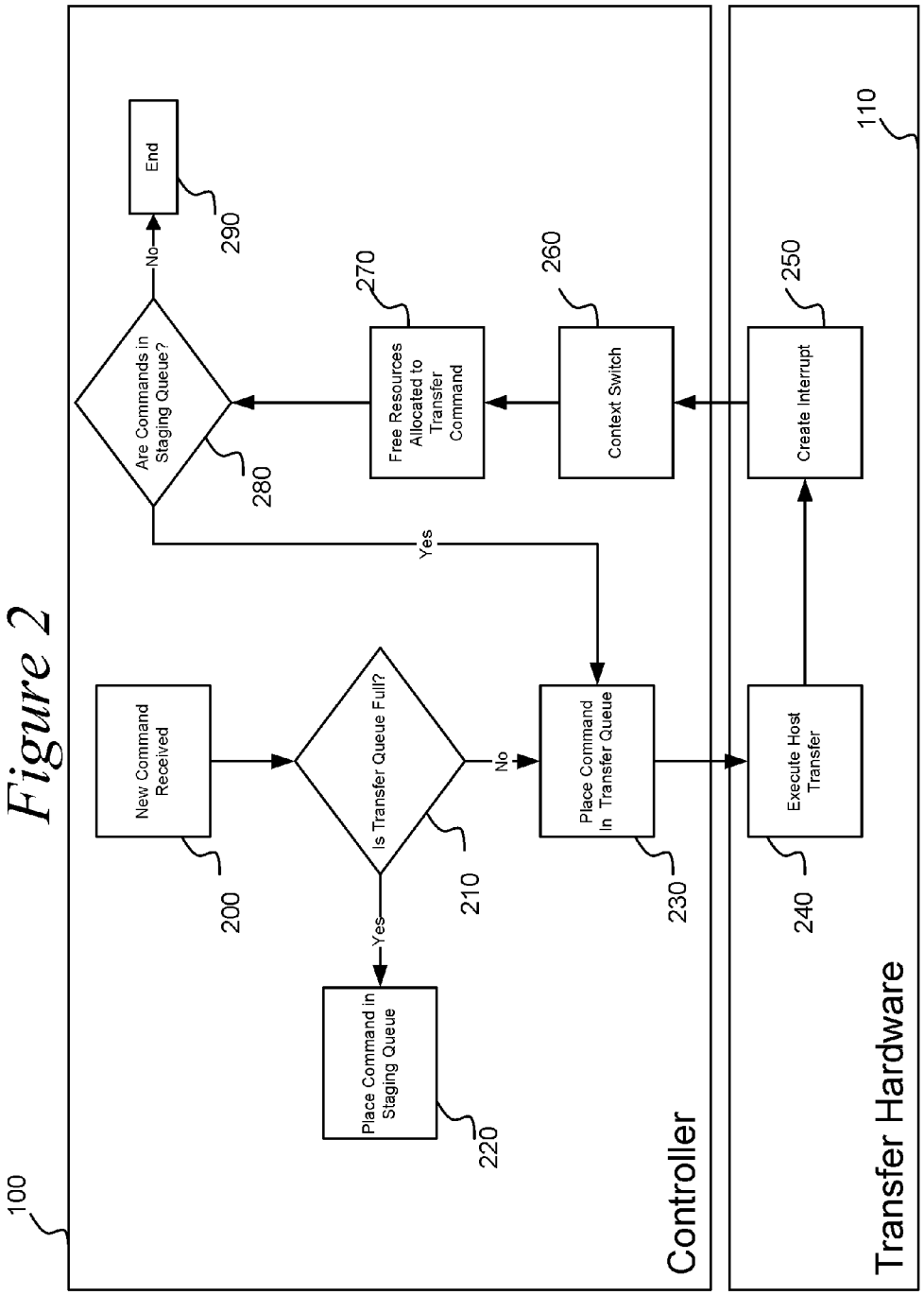
FIG. 2 shows a flowchart indicating the operation of a storage controller in communication with transfer hardware according to one embodiment.

FIG. 2 is a flowchart showing a process of generating a host transfer interrupt according to one embodiment. The top portion of FIG. 2 marked as 100 indicates portions of the process which can be executed on a storage device controller (such as the device controller 30 depicted in FIG. 1). The bottom portion of FIG. 2 marked as 110 indicates portions of the process which can be executed on transfer hardware on the storage device.

At block 200, the controller receives a command which is ready for a host transfer. At block 210, the controller checks whether the transfer queue is full and therefore unable to accept additional host transfer requests. If the host transfer queue is full, the controller can place the command in the staging queue as indicated by block 220. The command will remain in the staging queue until the transfer queue has an opening. Otherwise, if the transfer queue is not full, the command can be placed in the transfer queue at block 230. Next, the transfer hardware can execute the host transfer at block 240. After the command has been placed in the host transfer queue, the firmware in the controller can proceed to complete other tasks while the host transfer is pending, including receiving other commands and placing other commands in the transfer queue.

After the host transfer is complete, the transfer hardware generates an interrupt to indicate transfer completion at block 250. Upon receipt of the interrupt, the controller at block 260 executes a context switch to address the interrupt. The controller may be executing other processes while the host transfer is completing, such as memory management tasks. These processes are interrupted by the completion of the host transfer interrupt. After the interrupt, the controller frees the resources (e.g., portions of buffer memory in the operation transfer memory) allocated to the transfer command so that the resources can be used by another transfer command at block 270. After freeing resources, the controller checks whether there are commands remaining in the staging queue, at block 280. If there are commands remaining in the staging queue, the controller can place a command in the transfer queue by returning to block 230. If there are no commands in the staging queue, the process ends at block 290 and the controller awaits a new command before starting the process again.

Reducing Host Transfer Interrupts

As discussed above, in the embodiment shown in FIG. 2, an interrupt is generated by the transfer hardware on every transfer completion. This yields a significant amount of time that the processor on the device controller is interrupted from other management tasks. Embodiments of the invention provide an alternative approach which reduces the frequency of interrupting the processor. Typically, the need to interrupt the processor is created by the need to free the resources allocated to the just completed transfer command. By providing a system with sufficient buffer space in the operation transfer memory, a storage device can be configured so that the device controller does not require an interrupt on completion of every host transfer for the controller to manage memory resources allocated to processing host transfers. Various embodiments of the invention take advantage of the fact that, for an interface between a host and a storage device which implements a tagged command system, such as Tagged Command Queuing or Native Command Queuing, the maximum possible number of outstanding commands to the storage device is limited by the number of identifying tags in the interface specification. Two such interfaces are Serial ATA (SATA) and Serial Attached SCSI (SAS). As such, providing memory resources on the storage device sufficient to provision host transfer resources for all identifying tags simultaneously can reduce the need to explicitly free those resources on interrupt. In one embodiment, certain memory resource in the buffer of the operation transfer memory is allocated to each of the limited range of identification tags, and the resource is automatically re-used when a new command with the same identification tag is received. Although SATA and SAS are provided as examples, embodiments of the invention are not limited to storage devices implementing these interfaces and are generally applicable to any implementation that uses a form of tagged command system.

To further illustrate this configuration used in various embodiments, take for example a command with an identification tag of "5" that may be processed by the storage device controller. In this example, the storage device has already designated a buffer address for each identification tag number, and a buffer address "E" is designated for identification tag "5." Under this arrangement, the device controller does not need to be interrupted to explicitly free buffer address "E" when the host transfer is completed. The device controller understands that, due to the limited range of identification tags, the next time a command with the same identification tag "5" is received, the previous command with the same identification tag "5" must have completed. Hence, it is safe for the device controller to re-use buffer address "E" for the new command without relying on an interrupt to notify it of host transfer completion.

Figure 3:
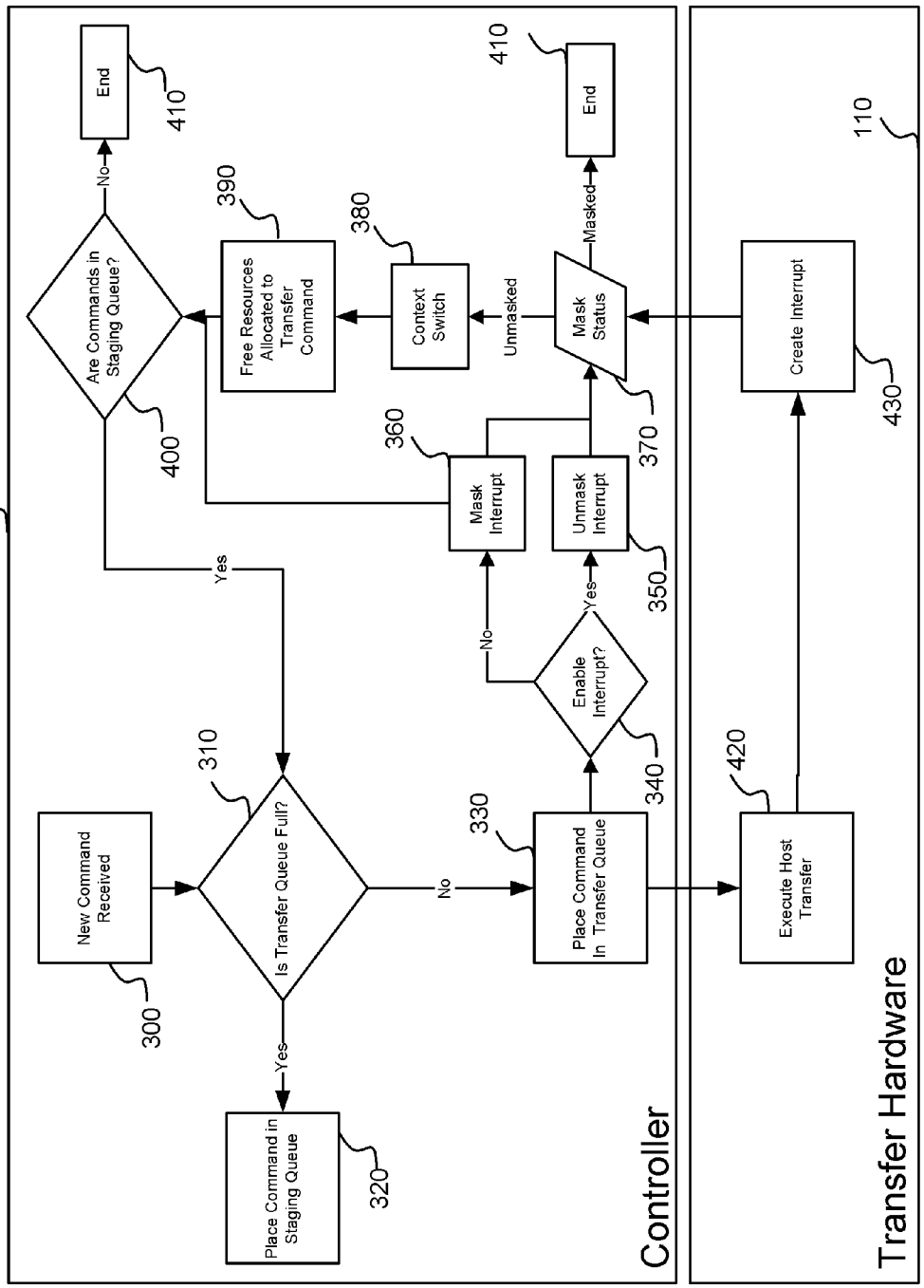
FIG. 3 shows a flowchart indicating the operation of a storage controller in communication with transfer hardware with reduced controller interrupts according to one embodiment.

Referring to FIG. 3, a flowchart is provided to show a process of reducing the number of interrupts provided to the controller according to one embodiment. As with FIG. 2, the top portion of FIG. 3 marked as 100 indicates portions of the process which can be executed on a storage device controller (such as the device controller 30 depicted in FIG. 1). The bottom portion of FIG. 3 marked as 110 indicates portions of the process which can be executed on transfer hardware on the storage device. In the embodiment shown in FIG. 3, after placing the command in the transfer queue at block 330, the controller determines whether to enable an interrupt at block 340. The decision of whether to enable an interrupt is discussed with further detail with reference to FIG. 4, below. As described further below, the enablement or disablement of an interrupt refers to whether the controller responds to an interrupt generated by the transfer hardware. In this embodiment, whether the controller responds to the interrupt generated by the transfer hardware 110 is controlled by masking or unmasking the interrupt bit(s) from the transfer hardware 110.

If the controller determines that an interrupt is necessary at block 340, the controller unmasks the interrupt bit(s) at block 350, which sets an "unmasked" status for the mask status check at block 370. If the controller determines an interrupt is not needed at block 340, the interrupt bit(s) is masked at block 360, which sets a "masked" status for the mask status check at block 370. If the interrupt bit(s) is masked, the controller continues with other tasks and is not interrupted when the interrupt is created by the transfer hardware. For example, after masking the interrupt bit(s) at block 360, the controller may then check whether there are any commands in the staging queue at block 400. In another embodiment, the bits can be masked/unmasked according to a different logic to indicate enablement/disablement. In other further embodiments, instead of masking bits, the controller may use other mechanisms (e.g., setting certain values in hardware or in memory) to indicate the enablement or disablement of an interrupt.

In this embodiment, when the transfer hardware 110 executes the host transfer at block 420, the transfer hardware 110 proceeds to create the interrupt 430 as in FIG. 2. Prior to the controller responding to the interrupt, the interrupt now passes through mask status check at block 370. If it is determined at mask status check 370 that the interrupt bit(s) associated with the interrupt has been masked, no further action is taken by the controller (as shown by block 410) and the controller continues executing other processes. If the interrupt generated is determined to be associated with an unmasked interrupt bit(s) at mark status check at block 370, the interrupt is processed by the controller. The controller then creates a context switch at block 380 in one embodiment and proceeds to blocks 390 and 400, as described above with relation to FIG. 2.

In other embodiments, several alternative configurations can be used to reduce the number of hardware interrupts processed by the controller 30. While the embodiment of FIG. 3 shows that an interrupt is always generated by the transfer hardware and selectively processed by the controller, other embodiments may allow the controller to deactivate an interrupt from being generated on the transfer hardware side. In some implementations, the hardware interrupt may be enabled or disabled based on individual host transfers, while in others, the hardware interrupt may be enabled or disabled based on a batch of host transfers. Those in the art would appreciate that other methods of selectively enabling hardware interrupt can be used in accordance with the general configuration described herein to reduce interruption of the controller at host transfer completion.

In one embodiment, it may be necessary to set up resources for each identification tag prior to the processing of a command as shown in FIG. 3. This can be accomplished by, for example, allocating specific memory resources (e.g., in the buffer of the operation transfer memory) for each identification tag on device power up. For example, each identification tag may be provided a dedicated portion of the buffer memory. As an alternative, the controller may be configured to alternate between modes of operation implementing and not implementing a selective interrupt scheme described above. The selective interrupt scheme could be activated after the always-interrupt scheme has allocated resources for each identification tag.

Conditions for Disabling the Host Transfer Interrupt

Figure 4:
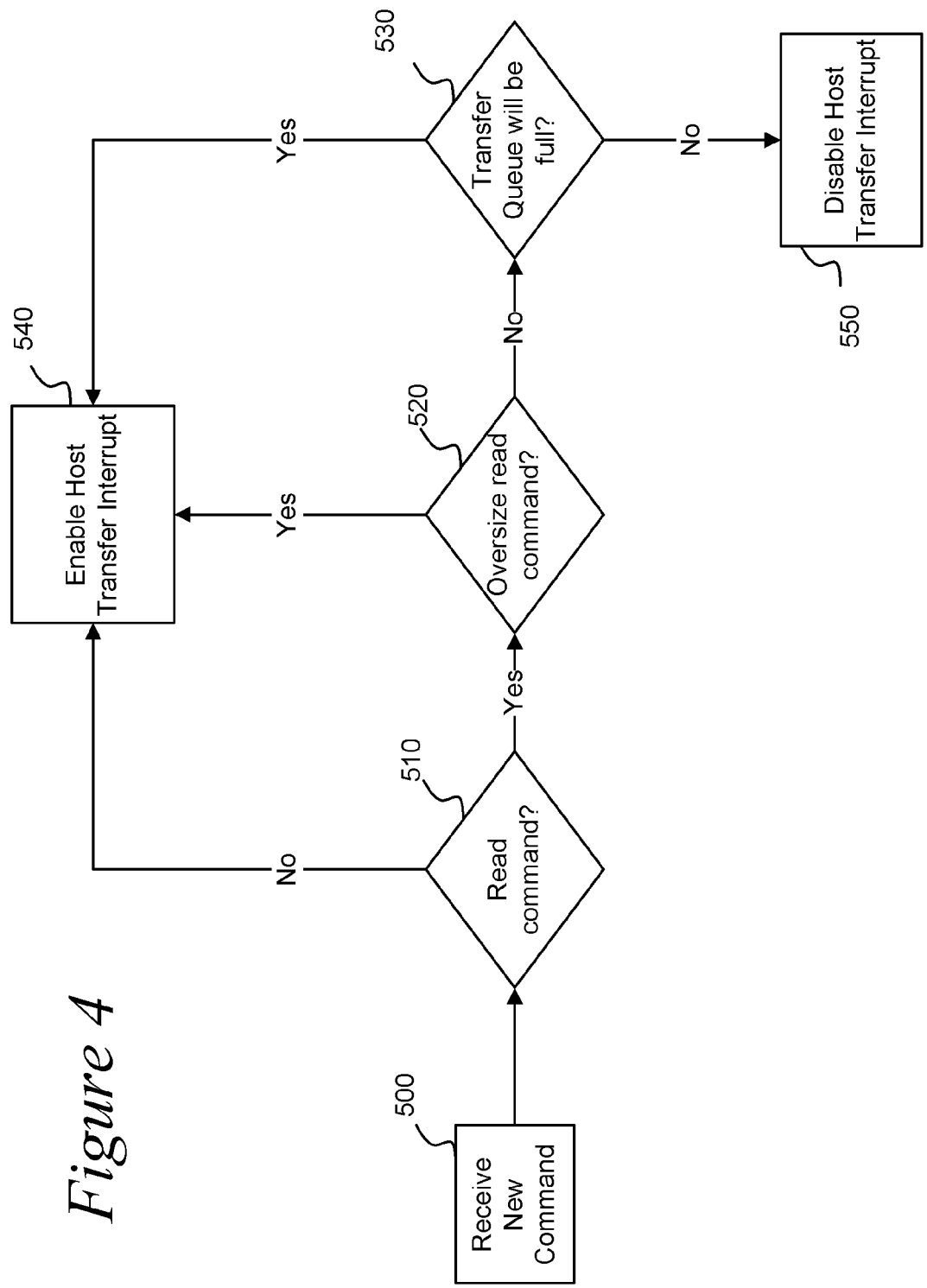
FIG. 4 shows a flowchart depicting a process that determines whether to enable a hardware transfer interrupt according to one embodiment.

FIG. 4 is a flowchart showing a process for determining whether to enable a host transfer interrupt based on certain conditions according to an embodiment. This process could be performed, for example, as part of the determination performed in block 340 of FIG. 3. As shown in the embodiment of FIG. 4, a new command is received by the process which determines whether to enable a host transfer interrupt at block 500. At block 510, it is determined whether the host transfer relates to a read command. In one embodiment, no host transfer interrupt may be necessary for a read command, because at execution of the read command host transfer, data previously read from the media is transferred to the host. At completion of the transfer, no further action is required by the controller to complete the read command. By contrast, for a write command, in certain embodiments the host transfer collects from the host the data the host has requested to write to the media storage. Additional action is thus required by the controller after receiving the data to effectuate the storage of the data. A host transfer complete interrupt can trigger transfer of the write command data to the storage media. Accordingly, if the command is not a read command, the host transfer interrupt is enabled at block 540. If the host transfer command is a read command, the process proceeds to block 520.

At block 520, the process in one embodiment determines whether the read command is an oversized read command. In an example embodiment, a read command which is larger than the amount of data which can be transferred in a single host transfer request is considered to be an oversized read command. For such an oversized read command, the controller may need to be interrupted at host transfer completion to create another host transfer including the remainder of the read data. As such, for an oversized read command, the host transfer interrupt can be enabled at block 540. For a normal sized read command, the process continues to block 530.

At block 530, the process in one embodiment determines whether addition of this command will fill the host transfer queue. If the host transfer queue will be full, then no additional transfers can be added to the queue after the present command is added. As such, additional transfers may be stored on the controller in a staging queue awaiting a slot in the host transfer queue. An interrupt may be generated in this circumstance to signal to the controller that a slot has become available at completion of the host transfer. According to this embodiment, the host transfer interrupt may be enabled at block 540 when the host transfer queue will be made full after the addition of the incoming command. Where the host transfer queue will not be made full by the addition of the incoming command, the host transfer interrupt will be disabled as indicated by block 550.

Depending on implementation details by the controller and interface, the conditions shown in FIG. 4 may vary in other embodiments of the invention. As an example, certain data transfer interfaces may not permit the use of oversize read commands, in which case a check for an oversize command will not be necessary and the controller will disable the interrupt for all read commands if certain other conditions are met. In other implementations, an interrupt may not be needed (and thus disabled) for a write command host transfer if the write data is passed directly to the media without any necessary controller actions. As a further example, the host transfer queue may have sufficient depth so that no staging queue is necessary, or cannot otherwise become unable to accept additional requests. In that case, the check performed in block 530 is not needed. Thus, in the various embodiments, the type of checks performed in the determination process of FIG. 4 may be different and/or performed in a different order than that which is depicted.

Conclusion

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile storage system capable of reducing interrupt overhead, comprising:
an interface configured to receive a command from a host device, the command including an identification tag, the identification tag chosen from a limited set of identification tags, each identification tag being unique to an outstanding command, the interface additionally configured to schedule host data transfers using a host communication thread, the host communication thread configured to produce an interrupt upon host transfer completion; and
a processor configured to manage communications with the host device through the interface, to determine whether to place the command in a first queue to be executed based on an available capacity of the first queue, to place the command in a second queue if it is determined that the first queue is filled to capacity, and to, upon placing the command in said first queue, selectively disable generation of an interrupt by the interface upon host transfer completion, said interrupt indicating a completion of a data transfer to the host device or from the host device, the selective disablement based at least in part on one of a command type, availability of interface resources to accept additional host transfers, and a command size, whereby the selective disablement reduces an overhead associated with executing the command.

2. The non-volatile storage system of claim 1, wherein the processor selectively disables generation of an interrupt for a read command.

3. The non-volatile storage system of claim 1, wherein the non-volatile storage system comprises a solid-state non-volatile memory array.

4. The non-volatile storage system of claim 1, wherein the identification tag comprises one of a tagged command queuing tag and a native command queuing tag.

5. The non-volatile storage system of claim 1, wherein the interface communicates to the host device using a Serial ATA (SATA) interface.

6. The non-volatile storage system of claim 1, wherein the interface communicates to the host device using a Serial Attached SCSI (SAS) interface.

7. The non-volatile storage system of claim 1, wherein the identification tag is assigned by a specific protocol.

8. The non-volatile storage system of claim 1, wherein the processor is further configured to respond to an interrupt by de-allocating resources allocated to a command for which a host data transfer is completed.

9. The non-volatile storage system of claim 8, wherein the processor is further configured to re-use resources allocated to the command when the interrupt is selectively disabled.

10. The non-volatile storage system of claim 9, wherein the resources are re-used by another command which includes the same identification tag included in the command, said another command stored in the second queue and to be transferred to the first queue upon said de-allocation.

11. The non-volatile storage system of claim 1, wherein the interrupt produced by the interface is configurably produced according to completion of each host transfer.

12. The non-volatile storage system of claim 1, wherein the interrupt produced by the interface is configurably produced according to completion of a batch of host transfers.

13. A method of host transfer request handling, comprising:
by a non-volatile storage device that communicates with a host system:
receiving a host transfer request from the host system, the host transfer request associated with an identification tag chosen from a limited set of identification tags, each identification tag being unique to an outstanding command;
storing the host transfer request in a queue of the non-volatile storage device;
executing the host transfer request using a host interface; and
determining, upon receiving and queuing the host transfer request, whether to interrupt a processor of the non-volatile storage device upon completion of the host transfer request to indicate a completion of a data transfer to the host system or from the host system, the determination on whether to interrupt the processor based at least in part on at least one of allocated resources associated with the host transfer request and an availability of interface resources to accept additional host transfer requests.

14. The method of host transfer request handling of claim 13, further comprising allocating resources for use with host transfer requests, the allocated resources associated with each identification tag within the limited set of identification tags, wherein the allocating step is performed prior to the receiving step.

15. A method performed by a storage subsystem that implements native command queuing, the method comprising:
receiving a tagged read command from a host system, and storing the tagged read command in a queue of the storage subsystem;
executing the tagged read command from the queue, wherein executing the tagged read command comprises transferring data stored by the storage subsystem to the host system; and
determining, upon storing the tagged read command in the queue, whether to execute an interrupt process associated with the tagged read command based at least partly on whether any other commands are stored in the queue, wherein the interrupt process indicates a completion of a data transfer to or from the host system.

16. The method of claim 15, wherein the method comprises inhibiting the interrupt process in response to determining that no other commands are stored in the queue, whereby overhead associated with the interrupt process is avoided.

17. The method of claim 15, wherein the storage subsystem receives and executes the tagged read command in accordance with a SATA interface.

18. The method of claim 15, wherein the storage subsystem receives and executes the tagged read command in accordance with a SAS interface.

* * * * *